Nov. 15, 1966  F. C. JELEN  3,285,859
ALKALI METAL SILICATES AND METHOD FOR PRODUCING THE SAME
Filed March 25, 1963
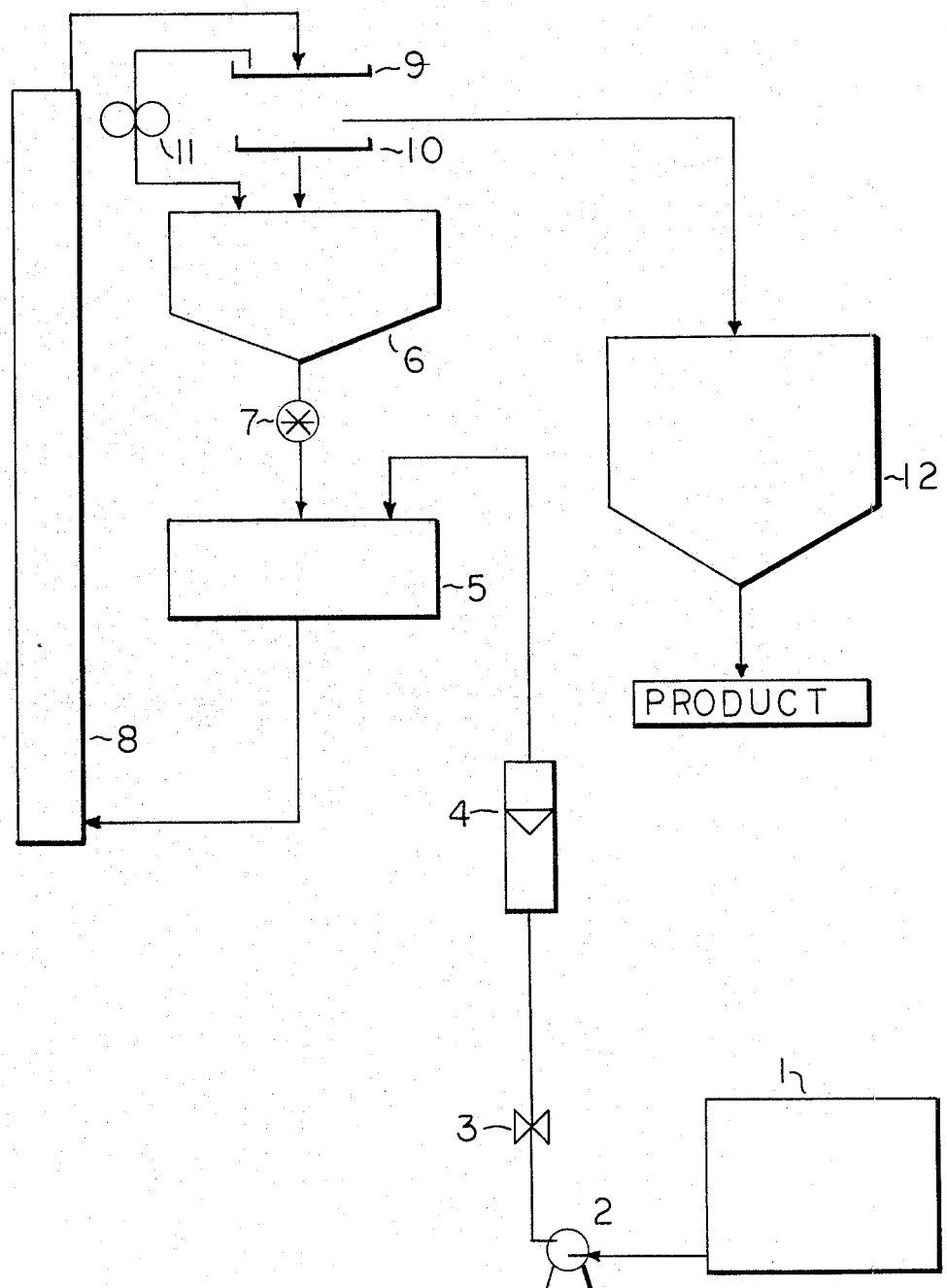
INVENTOR.
FREDERIC C. JELEN
BY
John P. Murphy
ATTORNEY

United States Patent Office 3,285,859
Patented Nov. 15, 1966

3,285,859
ALKALI METAL SILICATES AND METHOD FOR PRODUCING THE SAME
Frederic C. Jelen, Beaumont, Tex., assignor to Cowles Chemical Company, Cleveland, Ohio, a corporation of Ohio
Filed Mar. 25, 1963, Ser. No. 267,568
14 Claims. (Cl. 252—385)

The following is a continuation-in-part of application Serial No. 720,312, filed March 10, 1958, which has now become abandoned.

This invention relates to crystalline alkali metal silicates, and more particularly to the manufacture of dust-free, free-flowing solid particles of alkali metal silicates of substantially uniform size and of generally rounded shape.

There has long been a demand in the art of alkali metal silicates in a granular form which would be dust-free, free-flowing, and of uniform particle size. Being highly alkaline, the dust of an alkali metal silicate is particularly irritating if permitted to remain in contact with the skin, or if inhaled into the nasal passages or lungs. It is, therefore, essential for the comfort and health of those exposed to alkali metal silicates that such products be free of all dustiness. It is characteristic of granular alkali metal silicates that they tend to cake when exposed to the atmosphere for too long a period of time. This caking can, and often does, proceed to such a point that the material is very difficult to use. A resistance to the caking effect caused by exposure to the atmosphere is thus a commercially important property. Uniformity of particle size in a granular alkali metal silicate is advantageous in reducing the tendency toward caking; it is also beneficial in giving a rapid rate of solution. Generally, the larger particles present in a homogeneous granulated solid are the last to dissolve. The elimination of larger than average sized particles thus shortens the time required for complete solution, and the product is therefore more efficient in use. The present invention affords an advantageous method of producing granulated alkali metal silicates having these desirable properties.

It is an object of the present invention to provide a quickly-soluble alkali metal silicate having generally spherical particle shapes of substantially uniform size, which are dust-free and resistant to caking.

Alkali metal silicates of the prior art are generally prepared by evaporating an aqueous solution of the alkali metal silicate until it becomes supersaturated in respect to the alkali metal silicate at higher temperatures. Such a situation yields crystals of the desired alkali metal silicate. The following compositions are typical alkali metal silicates:

| Common Formula | Common Name |
|---|---|
| $Na_3HSiO_4 \cdot H_2O$ | Trisodium orthosilicate monohydrate; Sodium sesquisilicate monohydrate; |
| $Na_6Si_2O_7 \cdot 3H_2O$ | Sodium pyrosilicate trihydrate. |
| $Na_3HSiO_4 \cdot 2H_2O$ | Trisodium orthosilicate dihydrate; Sodium sesquisilicate dihydrate; |
| $Na_6Si_2O_7 \cdot 5H_2O$ | Sodium pyrosilicate pentahydrate. |
| $Na_3HSiO_4 \cdot 5H_2O$ | Trisodium orthosilicate pentahydrate; Sodium sesquisilicate pentahydrate; |
| $Na_6Si_2O_7 \cdot 11H_2O$ | Sodium pyrosilicate hendecahydrate. |
| $Na_2SiO_2 \cdot 1H_2O$ | Sodium metasilicate monohydrate. |
| $Na_2SiO_3 \cdot 5H_2O$ | Sodium metasilicate pentahydrate. |
| $Na_2SiO_3 \cdot 6H_2O$ | Sodium metasilicate hexahydrate. |
| $Na_2SiO_3 \cdot 8H_2O$ | Sodium metasilicate octahydrate. |
| $Na_2SiO_3 \cdot 9H_2O$ | Sodium metasilicate enneahydrate. |
| $Na_4Si_3O_{20} \cdot 11H_2O$ | Sodium tetrasilicate hydrate. |
| $K_2SiO_3 \cdot 0.5H_2O$ | Potassium metasilicate hemihydrate. |
| $K_2SiO_3 \cdot 1H_2O$ | Potassium metasilicate monohydrate. |
| $K_2Si_2O_5 \cdot H_2O$ | Potassium disilicate monohydrate. |
| $Na_2SiO_2$ | Anhydrous sodium metasilicate. |

The disclosure herein is directed primarily to the compound sodium metasilicate, and its various hydrates, which can be melted without composition change, because these are believed to be industrially the most important crystalline soluble, or alkali metal, silicates. Other crystalline alkali metal silicates are known to exist such as sodium disilicate, postassium metasilicate, potassium disilicate, lithium metasilicate, and others are likely to be discovered. To the extent that the methods herein disclosed and the products described are applicable to the prepartion of alkali metal silicates of other soluble silicates or other hydrates than those specifically mentioned, it is desired to include them within the scope of the invention.

The principal uses of alkali metal silicates are as detergent materials. They are used alone or in combination with other materials, depending upon the particular requirement of the intended application. Thus, it is common to mix alkali metal silicates with alkali metal hydroxides, phosphates, polyphosphates, carbonates, alkyl aryl sulfonates, fatty acid soaps, resin soaps, nonionic surface active agents, etc. to form useful compounded detergents. While such mixtures can generally be prepared as simple mechanical mixtures, these have a non-uniform appearance and often will separate during shipment and cause the user to obtain non-uniform results as he uses portions from different levels in the package. Efforts to add the above-mentioned compounding agents to molten alkali metal silicates prior to crystallization have generally resulted in such a retardation of the rate of crystallization that it is impractical to produce the products commercially.

With all of the foregoing in mind, further principal objects of the present invention are:

(1) The provision of a process which greatly reduces the time required for crystallization and thereby lowers the cost of the operation.

(2) The provision of an improved method for preparing homogeneous detergent mixtures containing an alkali metal silicate as the major component in combination with other desired materials.

(3) The provision of a method of preparing or solid masses of various alkali metal silicates such as sodium metasilicate, the individual particles of which have been previously agglomerated and which will not further agglomerate, thus maintaining a substantially uniform size of particles in the final packages product.

(4) The provision of a method of preparing crystalline alkali metal silicate, such as sodium metasilicate, which have substantially spherical particles of substantially uniform size.

(5) The provision of a method of preparing mixtures of crystalline alkali metal silicate, such as sodium metasilicate, with other materials, which mixtures are stable and relatively free of any tendency to agglomerate.

(6) The provision of a product comprising rounded particles of alkali metal silicates, such as sodium metasilicate, of substantially uniform size, each particle comprising a group of smaller, firstly crystallized particles of anhydrous sodium metasilicate held together in an agglomerated form in a matrix of secondly crystallized sodium metasilicate pentahydrate.

The present invention involves the addition of a portion of a molten hydrated alkali metal silicate to a large portion of a solid, granulated anhydrous alkali metal silicate, having a particle size generally smaller than that desired in the product, with good mechanical agitation and at a temperature favorable to rapid crystallization. The molten material agglomerates the solid particles and then crystallizes, yielding completely solid agglomerated particles of a size larger than the original particles. The agglomerated particles are then subjected to screening and particles of the desired size are removed as product. Smaller particles are recycled directly to the recrystallization operation and larger particles are first subjected to grinding and then are recycled to the crystallization operation. The rate of feeding of the molten material is adjusted so as to balance the rate of removal of the product.

The process of the present invention may be advantageously be practiced according to the method depicted in the figure. Feed tank 1 is charged with molten material of the chemical composition desired in the product. Fines bin 6 is charged with solid material of similar chemical composition, but having a particle size substantially smaller than that desired in the final product. The liquid feed flows through pump 2, through rate controlling valve 3 and through flowmeter 4 to the crystallizing mixer 5. Simultaneously, fines are charged into the crystallizer 5 through a metering feeder 7 at such a rate that the weight flow is greater than that of the molten liquid feed. The temperature in the crystallizer mixer 5 is maintained at such a level as to promote rapid crystallization. The sojourn time in the mixer 5 is adjusted so that a major portion of the crystallization is permitted to occur. The crystallizer effluent is then carried on elevator 8 to screens 9 and 10 and is screened. Oversize material is passed through grinder 11 and then is conveyed to the fines bin 6. The fines pass directly to the fines bin 6 and the fraction having the desired particle size range, as determined by screens 9 and 10 is withdrawn as product through product bin 12 and packaged in final form ready for use.

As indicated above, various other materials may be added to the alkali metal silicates prior to the crystallization so that a modified product will be produced.

Examples of such materials include materials having detergent building properties, such as:

Sodium chloride
Sodium sulfate
Trisodium phosphate
Sodium tripolyphosphate
Tetrasodium pyrophosphate
Sodium hexametaphosphate
Sodium carbonate
Sodium hydroxide Organic surface-active agents may also be added to the alkali metal silicate prior to crystallization. These include:

Sodium salts of fatty acids
Sodium salts of rosin acids
Sodium alkylaryl sulfonates
Sodium dialkyl sulfosuccinates
Sodium N-alkyl taurates
Sodium N-aryl glycinates The materials named above may be added to the alkali metal silicates in minor proportions in the form of the free acids. There may also be added nonionic surface-active agents, such as:

Alkylphenol polyglycol ethers
Alkyl polyglycol thioethers
Fatty acid polyglycol esters
Fatty acid alkylolamides In addition, there may be added in a similar manner other materials which enhance the commercial value of hydrated alkali metal silicates. Thus, it may be desired to include:

Alkali-stable dyes
Alkali-stable optical brighteners
Clays
Siliceous fillers
Carboxymethyl cellulose
Alkali-stable perfumes Such materials may be added to hydrated alkali metal silicates of the present invention. The scope of the present invention includes all such materials which do not seriously inhibit the crystallization of the hydrated alkali metal silicates. It is also often advantageous to use combinations of the above additives with a hydrated alkali metal silicate to obtain products of improved performance.

It has also been found that anhydrous alkali metal silicates, materials lacking water of hydration, can be used in conjunction with the above process. Anhydrous alkali metal silicates have many important commercial advantages over hydrated products for use as starting materials for producing a crystalline hydrated alkali metal silicate product. Water content in the final product can be carefully controlled, a decided advantage for some industrial purposes.

The use of anhydrous alkali metal silicates may be advantageously practiced as follows: A portion of molten hydrated alkali metal silicate is added to a second portion of anhydrous alkali metal silicate having a particle size smaller than the desired product, with good mechanical agitation of a temperature favorable to rapid crystallization. The resulting particles, larger than the original solid particles, are then screened and sorted. The oversize particles are ground and then used as the solid particles for additional cycles. It is seen that the solid particles, to which molten material is added, may be solely an anhydrous alkali metal silicate, a mixture of anhydrous and hydrated metal silicates and/or any of the aforementioned allowable substitutes such as detergents, organic surface-active agents, nonionic surface-active agents, etc.

The rate of crystallization of a hydrated alkali metal silicate is greatly dependent upon the temperatures employed. It has been found that the maximum rate to crystallization is generally about 20° C. below the melting point of the particular alkali metal silicate. Generally, the incorporation of other materials lowers the temperature required for the maximum crystallization rate. It is necessary that the crystallization be allowed to proceed sufficiently far in the crystallizing zone, as shown in the drawing, so that the effluent from this zone is not sticky, can be screened readily and will not cake. Generally, the time involved is less than twenty minutes. In the case of sodium metasilicate pentahydrate under optimum temperature conditions, the time involved is less than two minutes.

The feeding of solid particles finer than those desired in the product and in quantity greater than the molten feed to the crystallizing zone is necessary in order to obtain optimum results. Too small a feed of solid particles in relation to the molten feed will result in complete agglomeration of the crystallizing mass to a paste, which, on further crystallization will set up to a solid mass. Too large a feed of the solid, on the other hand, will result in too little agglomeration and will render the process impractical and uneconomical.

The following examples are submitted as illustrations of the invention. The examples do not, however, limit the invention since other embodiments not illustrated come within its scope. Although the language of the examples describes a single test, the results represent consistent data from a large number of experiments.

EXAMPLE I

Granular sodium metasilicate pentahydrate of a particle size smaller than 40 mesh was charged into a 100 gallon sigma blade mixer at the rate of about 1200 pounds per hour. Molten sodium metasilicate pentahydrate was added to the mixer at the rate of about 400 pounds per hour, and the temperature was maintained at 130–140° F. by cooling. The mixer was tilted at a 25° angle to permit a continuous discharge over the lower edge. The average retention time in the mixer was 18.7 minutes. The discharge from the mixer was a free-flowing agglomerated product having an average particle size larger than that of the feed material.

EXAMPLE II

Granular sodium metasilicate pentahydrate, at a temperature of 81° F. and of a particle size smaller than 40 mesh and greater than 20 mesh, was charged into a 100 gallon sigma blade mixer tilted at a 30° angle to permit discharge of the product at the rate of about 4500 pounds per hour. Molten sodium metasilicate pentahydrate at a temperature of 175° F. was added to the mixer at a rate of 1500 pounds per hour. The resulting mixture was then cooled, screened through the 20 and 40 mesh screens to produce a product, all the particles of which fall within the range of 20 to 40 mesh, and which is a dust-free, free-flowing product ready for packaging.

EXAMPLE III

A mixture of 47.5% by weight minus 35 mesh granulated sodium metasilicate pentahydrate, 27.5% minus 80 mesh anhydrous sodium metasilicate, and 25.0% molten sodium metasilicate pentahydrate at a temperature of 180° F. is fed continuously to a 100 gallon mixer tipped at a 30° angle to permit a discharge rate of 8,000 pounds per hour. The granulated sodium metasilicate pentahydrate, and the anhydrous sodium metasilicate are preferably mixed together before introduction into the mixer, but essentially all these components of the feed are added simultaneously to the mixer in a continuous manner. The resulting crystalline product was then sorted. Oversize particles are ground to at least a size able to pass a 35 mesh screen. Undersize particles were combined with the ground oversize particles and recycled to the process. For a given moisture content desired in the final product, the proportions of the recycle material, anhydrous sodium metasilicate and molten sodium metasilicate pentahydrate were fixed.

EXAMPLE IV

Two hundred thirty-eight pounds of granular sodium metasilicate pentahydrate of a minus 35 mesh size are charged to a 100 gallon blade mixer, and 137 pounds of anhydrous sodium metasilicate of a minus 80 mesh size is then added. These two charges are then mixed and heated to about 115–125° F., to which sodium metasilicate pentahydrate in the molten condition at 180° F. is then introduced in several thin streams. The mass becomes wettish and expands in volume immediately after addition of the molten sodium metasilicate pentahydrate. When the mixture has assumed a dry, free-flowing granular texture, it is discharged from the mixer and screened to a size between 20 and 35 mesh. Oversize and undersize particles are reduced to a minus 35 mesh size and recycled in the next batch.

EXAMPLE V

*5% fatty acid soap*

To 200 parts of molten sodium metasilicate pentahydrate containing essentially 98–99% of sodium metasilicate pentahydrate at 80° C. was added 0.45 part of powdered caustic soda (76% Na$_2$O) with agitation until dissolved. To the well agitated solution was added, in a fine stream, 10 parts of tallow fatty acid previously melted and heated to 60–70° C. The powdered caustic soda added was approximately equivalent to that required to form the sodium soap of the fatty acid. The resulting product was then crystallized by the process of Example II.

EXAMPLE VI

*5% sodium carbonate*

To 100 parts of molten sodium metasilicate pentahydrate containing essentially 98–99% of sodium metasilicate pentahydrate at 80° C. was added 4.2 parts of water. To this solution was added 19.4 parts of light soda ash (sodium carbonate) with good agitation to give a thin slurry. The resulting slurry contained approximately 58% of solids calculated as anhydrous sodium metasilicate and sodium carbonate. This slurry was then crystallized by the process of Example II.

EXAMPLE VII

*10% sodium carbonate*

To 100 parts of molten sodium metasilicate pentahydrate containing essentially 98–99% of sodium metasilicate pentahydrate at 80° C. was added 29.9 parts of water. To this solution was added 41.3 parts of light soda ash (sodium carbonate) with good agitation to give a thin slurry. The resulting slurry contained approximately 58% of solids calculated as anhydrous sodium metasilicate and sodium carbonate. This slurry was then crystallized by the process of Example II.

EXAMPLE VIII

*5% sodium tripolyphosphate*

To 100 parts of molten sodium metasilicate pentahydrate containing essentially 98–99% of sodium metasilicate pentahydrate at 80° C. was added 4.2 parts of water. To this solution was added 5.85 parts of powdered sodium tripolyphosphate with good agitation to give a thin slurry. The resulting slurry contained approximately 60% anhydrous solids, and was crystallized by the process of Example II. The water content of the slurry may be varied somewhat to give maximum crystallization rate.

EXAMPLE IX

*10% sodium tripolyphosphate*

To 100 parts of molten sodium metasilicate pentahydrate containing essentially 98–99% of sodium metasilicate pentahydrate at 80° C. was added 8.7 parts of water. To this solution was added 12.1 parts of powdered sodium tripolyphosphate with good agitation to give a thin slurry. The resulting slurry contained approximately 60% anhydrous solids, and was crystallized by the process of Example II. The water content of the slurry may be varied somewhat to give maximum crystallization rate.

EXAMPLE X

*15.5% sodium hydroxide, sodium sesquisilicate, hydrated*

To 1000 parts of molten sodium metasilicate pentahydrate containing essentially 98–99% of sodium metasilicate pentahydrate at 70° C. was added 186 parts of commercial powdered caustic soda (approximately 76% of Na$_2$O). The temperature rose to about 76° C. and an opaque solution was produced. This liquor was not stable below 70° C. (crystallization) or above 80° C. (formation or an insoluble dihydrate), so the solution was kept between 70–80° C. and crystallized by the process of Example II.

EXAMPLE XI

*Synthetic surfactants of the polyoxyethylene type (Triton X–100, etc.)*

While these types of surfactants are more or less miscible with aqueous solutions, they are generally insoluble at high alkali concentrations, and will separate as liquid phases after mixing into such highly alkaline solutions, such as sodium metasilicate pentahydrate liquor. While it is possible to crystallize polyethylene glycol p-tertiary octylphenyl monoether,

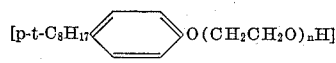

where *n* equals 10 (average) with sodium metasilicate pentahydrate by mixing it into a thick, seeded solution of sodium metasilicate pentahydrate, the procedure is not convenient and is impractical for the crystallization process wherein crystallization is effected by the process of Example II. It was found that if an amount of light soda ash (sodium carbonate), roughly equal to the amount of this type of surfactant to be added, was added, the surfactant seemed to be absorbed by the insoluble carbonate and the mixture was readily maintained as a homogenous slurry which could be crystallized by the process of Example II. Mixtures containing about 5% by weight of surfactant were readily prepared and the crystallized products were well crystallized and "dry." Amounts of normally liquid surfactants above 5% concentrations tended to give mixtures more difficult to crystallize and the products had a "wettish" appearance.

EXAMPLE XII

To 90 parts of sodium metasilicate pentahydrate containing essentially 98–99% of sodium metasilicate pentahydrate at 80° C. was added 5 parts of light soda ash with agitation. To this slurry was added 5 parts of polyethylene glycol p-teritary octylphenyl monoether,

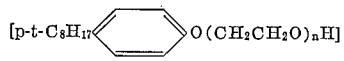

where $n$ equals 10 (average) with vigorous agitation. This slurry was kept well agitated until crystallization was effected by the usual processes. As with other such mixtures, the water content was varied somewhat to give optimum rates of crystallization.

It will be readily apparent from the prior description that the products and processes of the present invention have many important advantages. The products can be employed in all industrial applications in which quickly soluble silicates are useful which have a composition containing two molecules or more of silica to one molecule of alkali metal oxide. They are particularly useful in detergent operations. It is also evident that the particles of this invention can be mixed with various solids which may or may not consist of agglomerated particles. Owing to the spherical or rounded shape of the particles, they have little tendency to prevent the caking of other products with which they may be mixed. The agglomerated particles can therefore be used to produce stable mixtures with chemicals which would normally react with previously known hydrous silicates.

Other modifications of the processes described herein, which fall within the scope of the following claims, will be immediately evident to those skilled in the art.

It is claimed:

1. In the manufacture of dust-free, substantially spherical particles of hydrated alkali metal silicates of substantially uniform size, the steps of crystallizing particles of a hydrated alkali metal silicate, feeding said alakali metal silicate crystal to a mixer, then adding one part of a molten alkali metal silicate hydrate to at least three parts of solid crystalline hydrated alkali metal silicate hydrate, of a size smaller than the desired product, with good mechanical agitation, while maintaining the temperature of the mix at crystallizing temperature, screening the resultant dust-free spherical particles, and withdrawing the product, while feeding in an amount of alkali metal silicate hydrate equal to the amount of final product withdrawn.

2. In the manufacture of dust-free, substantially spherical particles of sodium silicate hydrate of substantially uniform size, the steps of crystallizing particles of a sodium silicate hydrate, feeding said sodium silicate hydrate crystal to a mixer, then adding one part of a molten sodium silicate hydrate to at least three parts of solid crystalline sodium silicate hydrate, of a size smaller than the desired product, with good mechanical agitation, while maintaining the temperature of the mix at crystallizing temperature, screening the resultant dust-free spherical particles, and withdrawing the product, while feeding in an amount of sodium silicate hydrate equal to the amount of final product withdrawn.

3. In the manufacture of dust-free, substantially spherical particles of sodium metasilicate pentahydrate of substantially uniform size, the steps of crystallizing particles of sodium metasilicate pentahydrate, feeding said sodium metasilicate pentahydrate crystal to a mixer, then adding one part of a molten sodium metasilicate pentahydrate to at least three parts of solid crystalline sodium metasilicate pentahydrate, of a size smaller than the desired product, with good mechanical agitation, while maintaining the temperature of the mix at crystallizing temperature, screening the resultant dust-free spherical particles, and withdrawing the product, while feeding in an amount of sodium metasilicate pentahydrate equal to the amount of final product withdrawn.

4. In the manufacture of dust-free, substantially spherical particles of sodium metasilicate monohydrate of substantially uniform size, the steps of crystallizing particles of a sodium metasilicate monohydrate, feeding said sodium metasilicate monohydrate crystal to a mixer, then adding one part of a molten sodium metasilicate monohydrate to at least three parts of solid crystalline sodium metasilicate monohydrate, of a size smaller than the desired product, with good mechanical agitation, while maintaining the temperature of the mix at crystallizing temperature, screening the resultant dust-free spherical particles, and withdrawing the product, while feeding in an amount of sodium metasilicate monohydrate equal to the amount of final product withdrawn.

5. In the manufacture of dust-free, substantially spherical particles of trisodium orthosilicate monohydrate of substantially uniform size, the steps of crystallizing particles of a trisodium orthosilicate monohydrate, feeding said trisodium orthosilicate monohydrate crystal to a mixer, then adding one part of a molten trisodium orthosilicate monohydrate to at least three parts of solid crystalline trisodium orthosilicate monohydrate, of a size smaller than the desired product, with good mechanical agitation, while maintaining the temperature of the mix at crystallizing temperature, screening the resultant dust-free spherical particles, and withdrawing the product, while feeding in an amount of trisodium orthosilicate monohydrate equal to the amount of final product withdrawn.

6. In the manufacture of dust free, substantially spherical particles of sodium sesquisilicate pentahydrate of substantially uniform size, the steps of crystallizing particles of a sodium sesquisilicate pentahydrate, feeding said sodium sesquisilicate pentahydrate crystal to a mixer, then adding one part of a molten sodium sesquisilicate pentahydrate to at least three parts of a solid crystalline sodium sesquisilicate pentahydrate, of a size smaller than the desired product, with good mechanical agitation, while maintaining the temperature of the mix at crystallizing temperature, screening the resultant dust free spherical particles, and withdrawing the product, while feeding in an amount of sodium sesquisilicate pentahydrate equal to the amount of final product withdrawn.

7. In the manufacture of dust free, substantially spherical particles of sodium pyrosilicate pentahydrate of substantially uniform size, the steps of crystallizing particles of a sodium pyrosilicate pentahydrate, feeding said sodium pyrosilicate pentahydrate crystal to a mixer, then adding one part of a molten sodium pyrosilicate pentahydrate to at least three parts of solid crystalline sodium pyrosilicate pentahydrate, of a size smaller than the desired product, with good mechanical agitation, while maintaining the temperature of the mix at crystallizing temperature, screening the resultant dust-free spherical particles, and withdrawing the product, while feeding in an amount of sodium pyrosilicate pentahydrate equal to the amount of final product withdrawn.

8. In a process for the manufacture of dust-free solid particles of hydrated alkali metal silicate of substantially uniform size, the step of adding one part of a hydrated molten alkali metal silicate with a member selected from the group consisting of soaps, non-ionic surface-active agents, carbonates and phosphates to at least three parts of solid, previously crystallized particles of a hydrated alkali metal silicate.

9. In a process for the manufacture of dust-free solid particles of sodium silicate hydrate of substantially uniform size, the step of adding one part of a hydrated molten sodium silicate with a member selected from the group consisting of soaps, non-ionic surface-active agents, carbonates, and phosphates to at least three parts of solid, previously crystallized particles of a sodium silicate hydrate.

10. In a process for the manufacture of dust-free solid particles of a sodium metasilicate pentahydrate of substantially uniform size, the step of adding one part of a hydrated molten sodium metasilicate pentahydrate with a member selected from the group consisting of soaps, non-ionic surface-active agents, carbonates and phosphates to at least three parts of solid, previously crystallized particles of sodium metasilicate pentahydrate.

11. In a process for the manufacture of dust-free solid particles of a sodium metasilicate monohydrate of substantially uniform size, the step of adding one part of a hydrated molten metasilicate monohydrate with a member selected from the group consisting of soaps, non-ionic surface-active agents, carbonates, and phosphates to at least three parts of solid, previously crystallized particles of a sodium metasilicate monohydrate.

12. In a process for the manufacture of dust-free solid particles of a trisodium orthosilicate monohydrate of substantially uniform size, the step of adding one part of a hydrated molten trisodium orthosilicate monohydrate with a member selected from the group consisting of soaps, non-ionic surface-active agents, carbonates, and phosphates to at least three parts of solid, previously crystallized particles of a trisodium orthosilicate monohydrate.

13. In a process for the manufacture of dust-free solid particles of a sodium sesquisilicate pentahydrate of substantially uniform size, the step of adding one part of a hydrated molten sodium sesquisilicate pentahydrate with a member selected from the group consisting of soaps, non-ionic surface-active agents, carbonates and phosphates to at least three parts of solid, previously crystallized particles of a sodium sesquisilicate pentahydrate.

14. In a process for the manufacture of dust-free solid particles of a sodium pyrosilicate pentahydrate of substantially uniform size, the step of adding one part of a hydrated molten sodium pyrosilicate pentahydrate with a member selected from the group consisting of soaps, non-ionic surface-active agents, carbonates, and phosphates, to at least three parts of solid, previously crystallized particles of a sodium pyrosilicate pentahydrate.

References Cited by the Examiner

UNITED STATES PATENTS

| | | | |
|---|---|---|---|
| 2,017,561 | 10/1935 | Baker | 23—302 XR |
| 2,243,054 | 5/1941 | Vail | 252—109 |
| 2,282,018 | 5/1942 | Baker | 252—385 |
| 2,502,881 | 4/1950 | Parker | 252—109 |

LEON D. ROSDOL, *Primary Examiner.*

JULIUS GREENWALD, *Examiner.*

M. WEINBLATT, *Assistant Examiner.*